United States Patent [19]
Bunyer et al.

[11] Patent Number: 5,729,128
[45] Date of Patent: Mar. 17, 1998

[54] MAGNETIC SENSOR WITH A MAGNETICALLY SENSITIVE COMPONENT THAT IS MOVABLE DURING CALIBRATION AND RIGIDLY ATTACHABLE TO A FORMED MAGNET

[75] Inventors: Scott L. Bunyer; Nicholas F. Busch; Joel D. Stolfus, all of Freeport, Ill.

[73] Assignee: Honeywell Inc., Minneapolis, Minn.

[21] Appl. No.: 754,483

[22] Filed: Nov. 22, 1996

[51] Int. Cl.$^6$ .................... G01B 7/14; G01B 7/30; H01L 43/06; G01R 35/00
[52] U.S. Cl. .................. 324/202; 324/207.2; 324/174
[58] Field of Search .................. 324/202, 207.2, 324/207.21, 207.24, 207.25, 207.26, 251, 252, 173, 174; 338/32 R, 32 H; 335/302; 29/595, 607, 854

[56] References Cited

U.S. PATENT DOCUMENTS 5,414,355  5/1995  Davidson et al. .
5,500,589  3/1996  Sumcad .

*Primary Examiner*—Walter E. Snow
*Attorney, Agent, or Firm*—William D. Lanyi

[57] ABSTRACT

A magnetic sensor is provided which utilizes a molded magnet with a channel formed therein. A magnetically sensitive component, such as a Hall effect element, is attached to a substrate or printed circuit board. The printed circuit board, or substrate, is provided with an opening through its thickness that is shaped to accept a post with a certain amount of clearance therebetween. This allows the printed circuit board to be moved relative to the magnet during calibration procedures and then rigidly attached in a position relative to the magnet by soldering the post to the substrate or printed circuit board. This places the magnetically sensitive component at a desirable location relative to the magnet and within the channel formed in the magnet. The post can be molded into the magnet or formed as an integral portion of the magnet.

15 Claims, 6 Drawing Sheets

MAGNETIC SENSOR WITH A MAGNETICALLY SENSITIVE COMPONENT THAT IS MOVABLE DURING CALIBRATION AND RIGIDLY ATTACHABLE TO A FORMED MAGNET

BACKGROUND OF THE INVENTION

1. Field of the Invention

The present invention is generally related to magnetic sensors and, more particularly, to a magnetic sensor that attaches a magnetically sensitive component to a substrate, or circuit board, and allows the magnetically sensitive component to be moved during calibration procedures and then rigidly attached to a protrusion of a permanent magnet.

2. Description of the Prior Art

Many types of magnetic sensors are known to those skilled in the art. Some magnetic sensors are used as geartooth sensors that provide output signals which are responsive to the movement of ferromagnetic teeth of a gear through a detection zone proximate a pole face of a magnet. Certain types of magnetic sensors are used in conjunction with automobile engines in order to provide signals that are responsive to the rotation of certain engine components. These signals are used by engine control systems.

Two features of magnetic sensors are important. The sensor must be able to be calibrated accurately so that the output signals from a magnetically sensitive component precisely correspond to the passage of ferromagnetic teeth through the detection zone of the sensor. Additionally, it is desirable to manufacture the magnetic sensor so that its overall size and number of components are minimized and its total cost is reduced. The magnetically sensitive component used in magnetic sensors can comprise magnetoresistors or Hall effect elements. Many different types of sensors have been developed which suit particular purposes. In certain magnetic sensors, the magnetically sensitive component must be positioned accurately during an active calibration so that the output signals from the sensor are precisely responsive to the position of gearteeth, notwithstanding the possible variation in magnetic field strength and the uniformity of the magnetic field provided by the magnet.

U.S. patent application Ser. No. 08/531,806(M1016072), which was filed on Sep. 21, 1995 by Busch, now U.S. Pat. No. 5,596,272, describes a magnetic sensor with a beveled permanent magnet. The beveled surface intersects a first pole face at a preselected angle. The permanent magnet is associated with a magnetically sensitive component that comprises first and second magnetoresistive elements. Both of the magnetoresistive elements comprise two magnetoresistors. The four magnetoresistors are connected in electrical communication with each other to form a Wheatstone bridge that provides an output signal representative of the magnetic field strength in the sensing plane of the magnetically sensitive component. The beveled magnet provides a magnetic field which relates to a magnetically sensitive component in such a way that the position of a magnetic null in the sensing plane is advantageously affected.

U.S. Pat. No. 5,500,589, which issued to Sumcad on Mar. 19, 1996, describes a method for calibrating a sensor by moving a magnet while monitoring an output signal from a magnetically sensitive component. The sensor is provided with a carrier that has a cavity shaped to receive a magnet in sliding association therein. Ribs are provided to guide the movement of the magnet into the cavity and a deformable rib is used to hold the magnet at a precise position determined by an active calibration process. A magnetically sensitive component is rigidly attached to a substrate and the substrate is rigidly attached to the carrier in which the cavity is formed. Electrically conductive leads are molded into the carrier and extend through the carrier to positions where they can be electrically connected to circuit runs on the substrate. A flexible wall can also be formed in the carrier to deflect in response to the insertion of a magnet into the cavity. This provides additional holding capability that retains the magnet in position when an external force is removed.

U.S. Pat. No. 5,414,355, which issued to Davidson et al on May 9, 1995, discloses a magnet carrier disposed within an outer housing. The sensor is provided with the housing in which a carrier is inserted. The carrier is particularly shaped to retain a permanent magnet in a particular position relative to a plurality of electrical conductors and a substrate on which a magnetically sensitive component is attached. The carrier and its associated components is inserted into a housing which can be deformed to permanently retain the carrier within a cavity of the housing. All of the components of the sensor are designed to be easily assembled along a common axis to facilitate automatic assembly and manufacture of the sensor. The magnetically sensitive component can be a Hall effect element that is associated with other electrical components which are also attached to a substrate that is disposed proximate a front end of the carrier.

SUMMARY OF THE INVENTION

A magnetic sensor made in accordance with the present invention comprises a permanent magnet which has a first pole face and a second pole face. The first and second pole faces are generally perpendicular to an axial centerline which extends along the central axis of the permanent magnet. A channel is formed in the permanent magnet in a direction along the centerline. In one particularly preferred embodiment of the present invention, the channel is formed by molding a magnet in a shape which has a generally U-shaped cross section.

A preferred embodiment of the present invention further comprises a magnetically sensitive component that is disposed at least partially within the channel with its sensing plane disposed in generally perpendicular association with the centerline of the permanent magnet that extends along the channel. A substrate, or printed circuit board, is provided with an opening formed therethrough. The magnetically sensitive component is attached to the substrate.

A post is attached to the permanent magnet and disposed through the opening of the substrate. The opening that extends through the thickness of the substrate is larger than the cross sectional dimensions of the post so that the substrate can be moved through a range of positions while the post extends through opening. The substrate can be moved to dispose the magnetically sensitive component at a preselected position relative to the permanent magnet. The preselected position is determined by monitoring an output signal from the magnetically sensitive component as the substrate is moved relative to the permanent magnet. When the magnetically sensitive component is in the optimal position, based on the output signals from the component, the post is rigidly attached to the substrate. This positioning of the magnetically sensitive component can be accomplished by soldering the post to a metallic run that is disposed around the opening on one of the surfaces of the substrate.

In a particularly preferred embodiment of the present invention, the permanent magnet is a molded magnet made of a neodymium-iron-boron in a thermoplastic material. The post is a metallic shaft that is plated to improve solderability and is molded into the permanent magnet during its manufacture. The magnetically sensitive component can comprise a Hall effect element, but it should be understood that alternative magnetically sensitive components are also possible.

In a particularly preferred embodiment of the present invention, the edges of the permanent magnet, where the first pole face meets the channel formed in the magnet, are beveled in order to take advantage of the magnetic field shape that results from this optional beveling of the magnet. In certain embodiments of the present invention, the magnetically sensitive component is disposed completely within the channel. However, during the calibration procedure the magnetically sensitive component may be moved to a position where it partially protrudes beyond the channel and extends outwardly from the first pole face of the magnet. The post, in certain alternative embodiments of the present invention, can be formed as an integral part of the permanent magnet.

BRIEF DESCRIPTION OF THE DRAWINGS

The present invention will be more fully and completely understood from a reading of the Description of the Preferred Embodiment in conjunction with the drawings, in which.

DESCRIPTION OF THE PREFERRED EMBODIMENT

Figure 1:
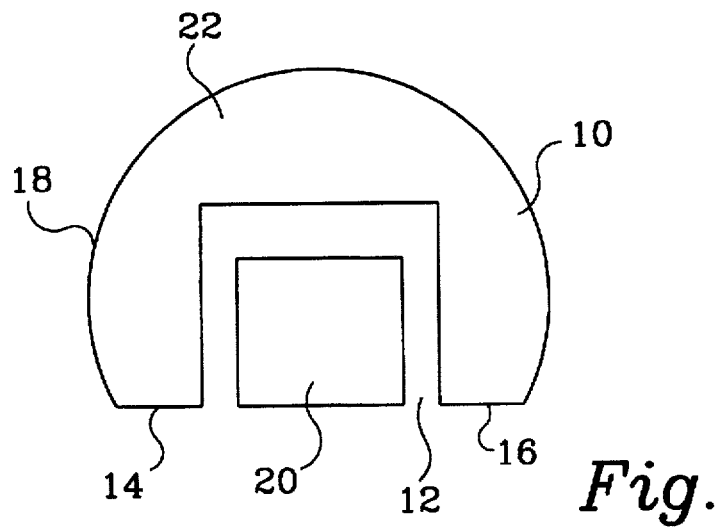
FIGS. 1 and 2 are simplified illustrations of a permanent magnet in combination with a magnetically sensitive component.

Throughout the Description of the Preferred Embodiment, like components will be identified by like reference numerals.

FIGS. 1-5 are highly simplified illustrations that are intended to assist in the basic description of the invention. The other Figures are much more detailed and show one particularly preferred embodiment of the present invention.

In FIG. 1, a permanent magnet 10 is shown in an end view with a channel 12 formed within its structure. The permanent magnet 10 is not completely circular in cross section but, instead, has two generally flat faces, 14 and 16. The channel 12 is formed in the magnet and intersects with the flat faces, 14 and 16. The axial surface 18 of the magnet 10 is generally cylindrical except for the truncated shaped which results in the flat faces, 14 and 16. A magnetically sensitive component 20 is shown disposed in the channel 12 of the magnet. The view of FIG. 1 is in a direction facing a first pole face 22 of the magnet.

Figure 2:
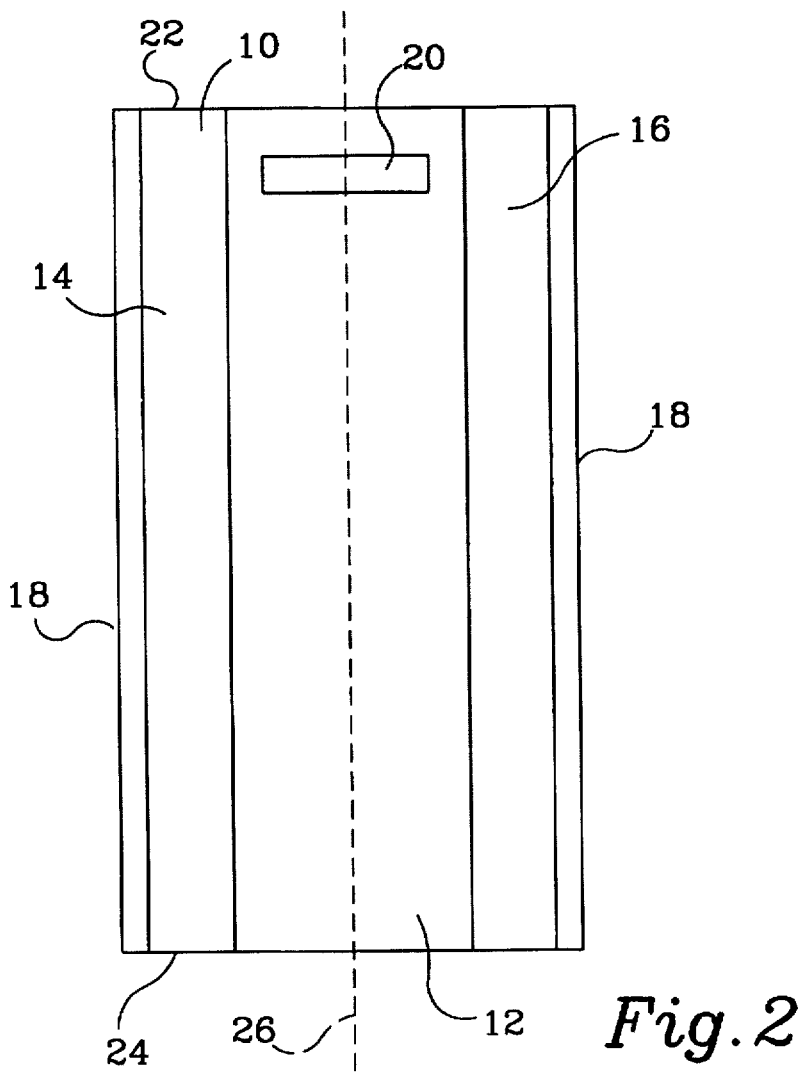

FIG. 2 is a side view of the arrangement illustrated in FIG. 1. The magnet 10 is shown with a first pole face 22 and a second pole face 24 at its opposite axial ends. The channel 12 extends along the length of the magnet between the first and second pole faces, 22 and 24, and along a centerline 26. The two generally flat faces, 14 and 16, are visible in FIG. 2 along with the generally cylindrical outer surface 18. The magnetically sensitive component 20 is disposed within the channel 12. In FIG. 2, the magnetically sensitive component 20 is shown disposed completely within the channel 12, but it should be understood that alternative positions of the magnetically sensitive component 20 along centerline 26 could place it higher in FIG. 2 at a position where it partially protrudes above the first pole face 22.

Figure 3:
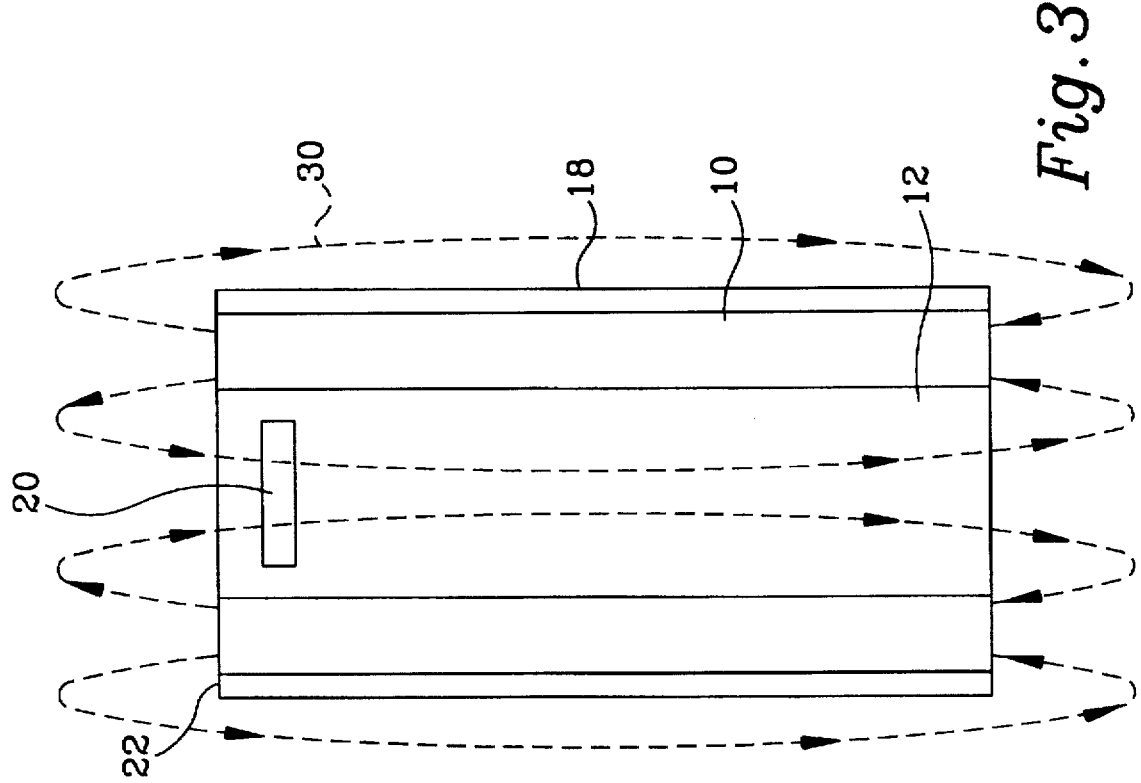
FIG. 3 shows the illustration of FIG. 2 with the additional depiction of exemplary lines of magnetic flux.

FIG. 3 shows the permanent magnet 10 and the Hall effect element 20 of FIG. 2, but with the additional illustration of exemplary lines of magnetic flux 30. In FIG. 3, it can be seen that the lines of flux passing from the first pole face to the second pole face extend through the magnetically sensitive component 20. For purposes of this description, it will be assumed that a Hall effect element is used as the magnetically sensitive component. Therefore, the sensing plane of the magnetically sensitive component 20 would lie in a generally horizontal plane in FIG. 3 and would be sensitive to the strength of the vertical components of magnetic flux. If a ferromagnetic object passes through the detection zone above the first pole face 22, the lines of flux in that region will be distorted by the presence of the ferromagnetic object. As is well known to those skilled in the art, the ferromagnetic object can be the tooth of a gear. When the lines of flux 30 are distorted by the presence of a ferromagnetic object in the detection zone, the vertical components of those line of flux passing through the magnetically sensitive component 20 will change. This enables the magnetically sensitive component to provide an output signal that is responsive to the position of a ferromagnetic object in the detection zone.

As is well known to those skilled in the art, permanent magnets are not perfectly uniform in their magnetic field configuration and strength. Therefore, it is beneficial to position the magnetically sensitive component at a preselected location relative to the permanent magnet that results in an output signal which conforms to certain predetermined characteristics when no ferromagnetic object is within the detection zone.

Figure 4:
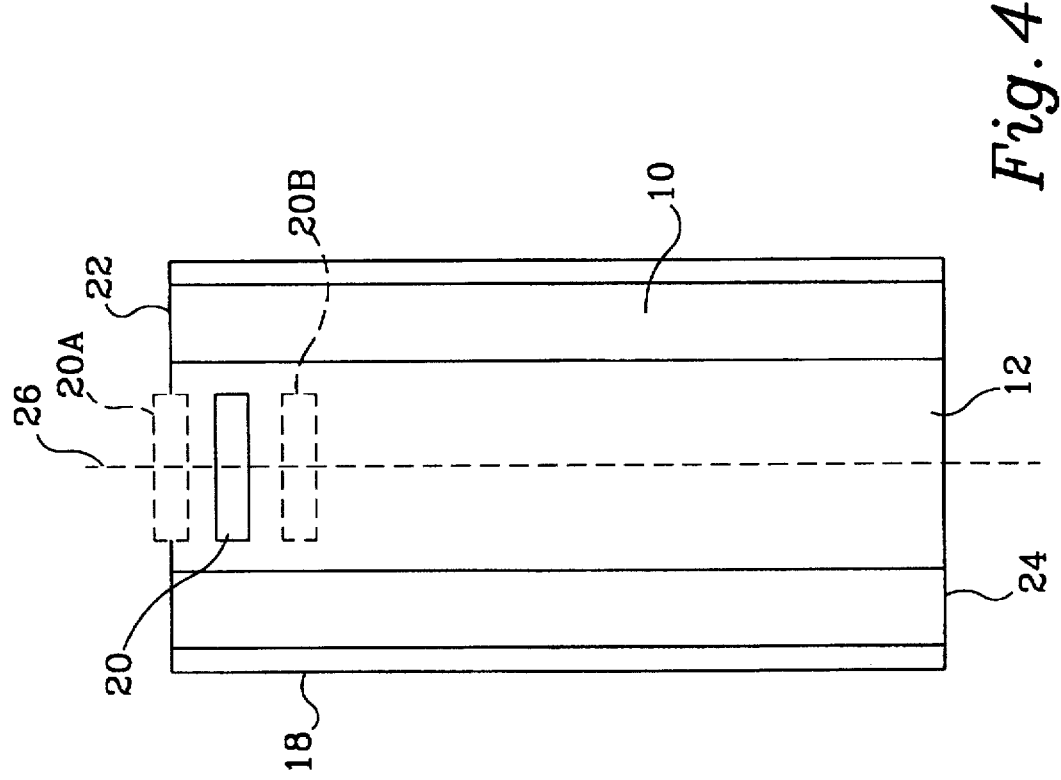
FIG. 4 shows a permanent magnet in conjunction with the magnetically sensitive component illustrated at several alternative positions.

FIG. 4 is generally similar to FIG. 3, but shows alternative positions for the magnetically sensitive component 20. During the calibration procedure, as the output signals from the magnetically sensitive component 20 are monitored, it can be moved slightly in an attempt to improve the characteristics of the output signal when no ferromagnetic object is within the detection zone. It might be moved upward along the centerline 26 to the position identified by reference numeral 20A or, alternatively, downward along the centerline 26 to the position identified by reference numeral 20B. Theoretically, the magnetically sensitive component 20 can be moved to an infinite number of positions within the channel 12 until an appropriate output signal is sensed.

Figure 5:
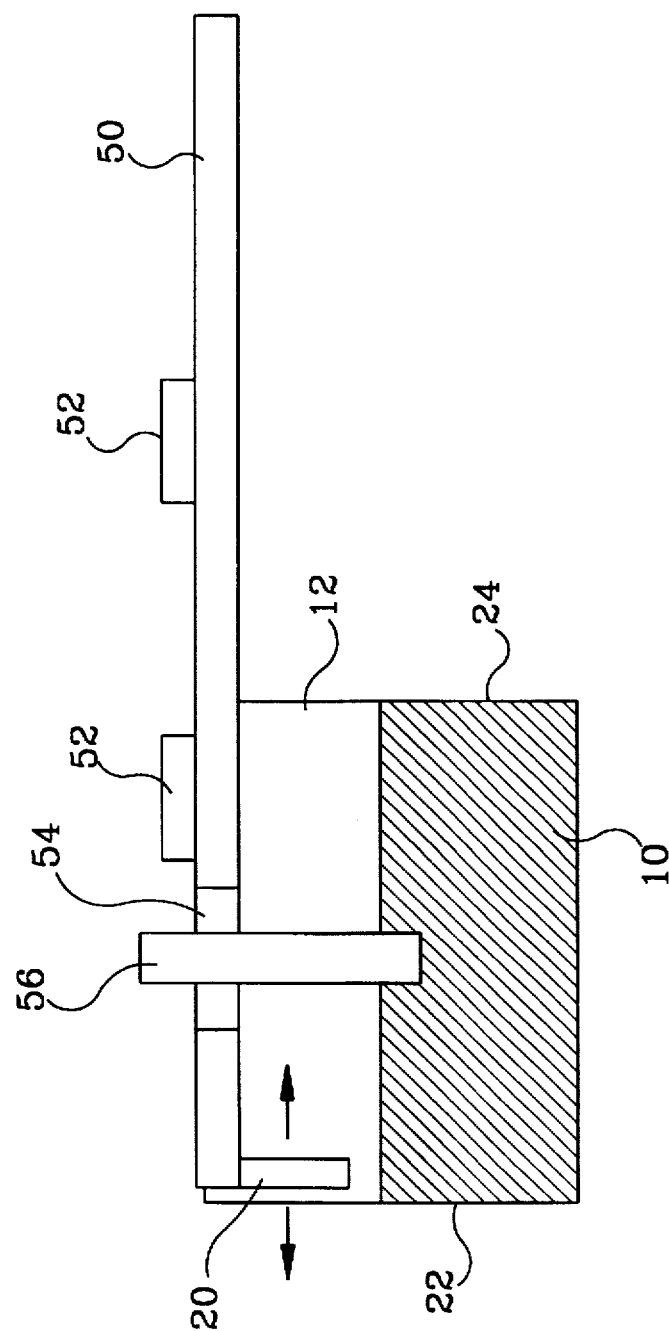
FIG. 5 shows a sectional view of a permanent magnet in combination with a substrate that is movable relative to a post extending from the permanent magnet.

FIG. 5 shows the magnet 10 with its first pole face 22 and second pole face 24. The magnetically sensitive component 20 is disposed in the channel 12. The magnetically sensitive component 20 is attached to a substrate 50 which, in most applications of the present invention, comprises a printed circuit board with a plurality of electronic components disposed on its surface. For purposes of this description, the electronic components are generically identified by reference numeral 52. The specific type of electronic component attached to the printed circuit board is not directly relevant to the present invention and will not be described in greater detail herein. The substrate 50 is provided with an opening 54 extending through its thickness. A post 56 is attached to the magnet 10 and extends upwardly through the channel 12 in FIG. 5. The substrate 50 can be positioned to allow the post 56 to extend through its opening 54 as shown. The opening 54 is shaped to provide clearance for the post 56. In other words, with the post 56 extending through opening 54, the substrate 50 can be moved left or right as indicated by the arrows in FIG. 5 without being limited by contact between the post 56 and the substrate 50. The opening 54 is provided with some type of solderable material surrounding it to permit the post 56 to be rigidly and firmly soldered to the substrate 50 when it is determined that the magnetically sensitive component 20 is in a proper location. This determination is made during an active calibration procedure.

With reference to FIGS. 1–5, it should be understood that the illustrations are highly schematic and are intended to facilitate a basic discussion of the concepts of the present invention. FIGS. 6–11 are much more detailed and are intended to illustrate one particularly preferred embodiment of the present invention and can be used as a location hole.

Figure 6:
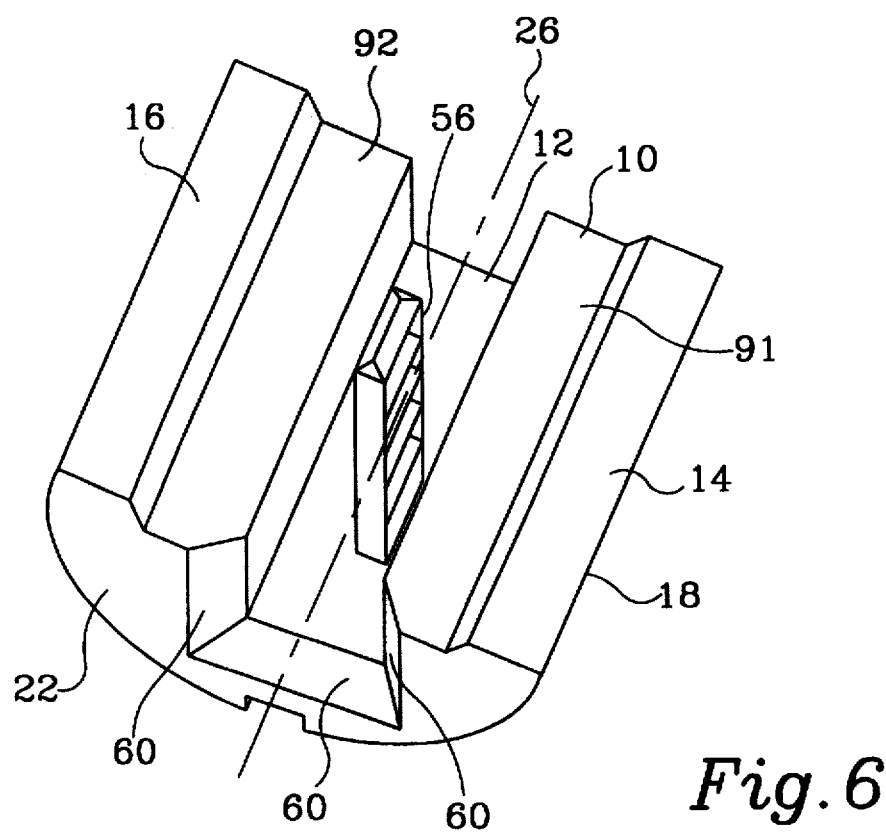
FIG. 6 is a perspective view of a molded permanent magnet with a post inserted in it.

FIG. 6 illustrates the permanent magnet 10 with its generally cylindrical surface 18 and flat faces, 14 and 16. The first pole face 22 is shown in association with the channel 12 that is formed in the permanent magnet 10. The post 56 is molded into the permanent magnet 10 and extends upwardly through the channel 12. In the particular structure illustrated in FIG. 6, the edges of the permanent magnet, where the first pole face 22 meet the walls of channel 12, are beveled. These bevels 60 provide a degree of advantageous shaping of the magnetic field provided by the permanent magnet 10.

Figure 7:
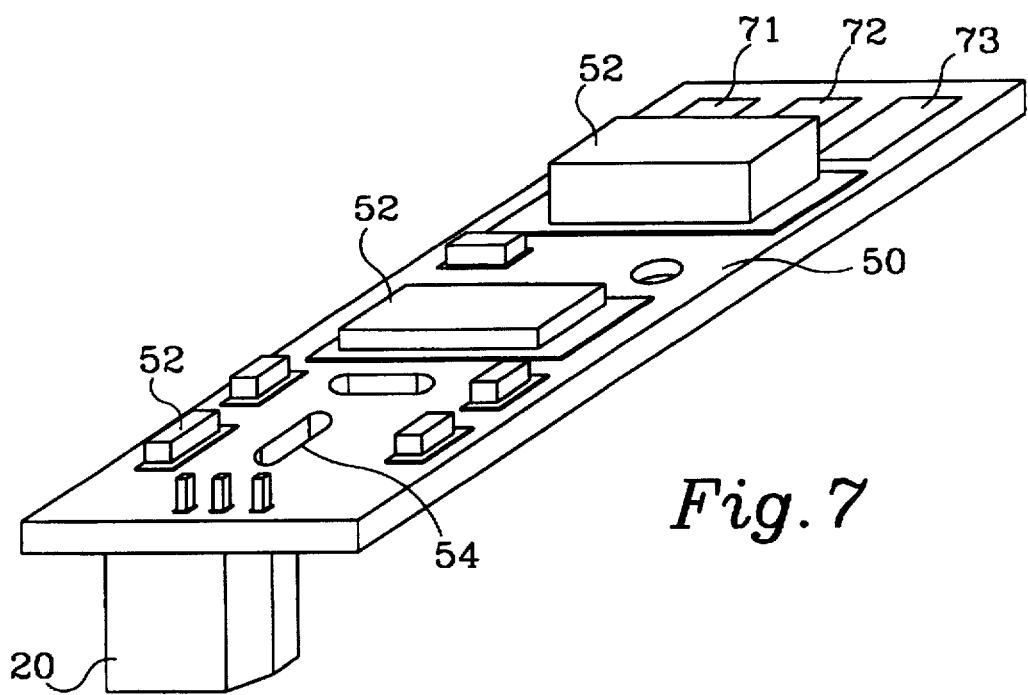
FIG. 7 is a perspective view of a substrate, or printed circuit board, with a magnetically sensitive component attached to it.

FIG. 7 shows the substrate 50 with several electronic components 52 attached to its surface. The magnetically sensitive component 20 is attached to the substrate 50 by pins that extend upwardly through holes in the substrate and are soldered to preselected conductive runs disposed on the upper surface of the substrate 50, which can be a printed circuit board in a preferred embodiment of the present invention. At the opposite end of the substrate 50 from the magnetically sensitive component 20, three conductive pads, 71–73, are provided to allow the printed circuit board to be connected to electrically conductive leads.

Figure 8:
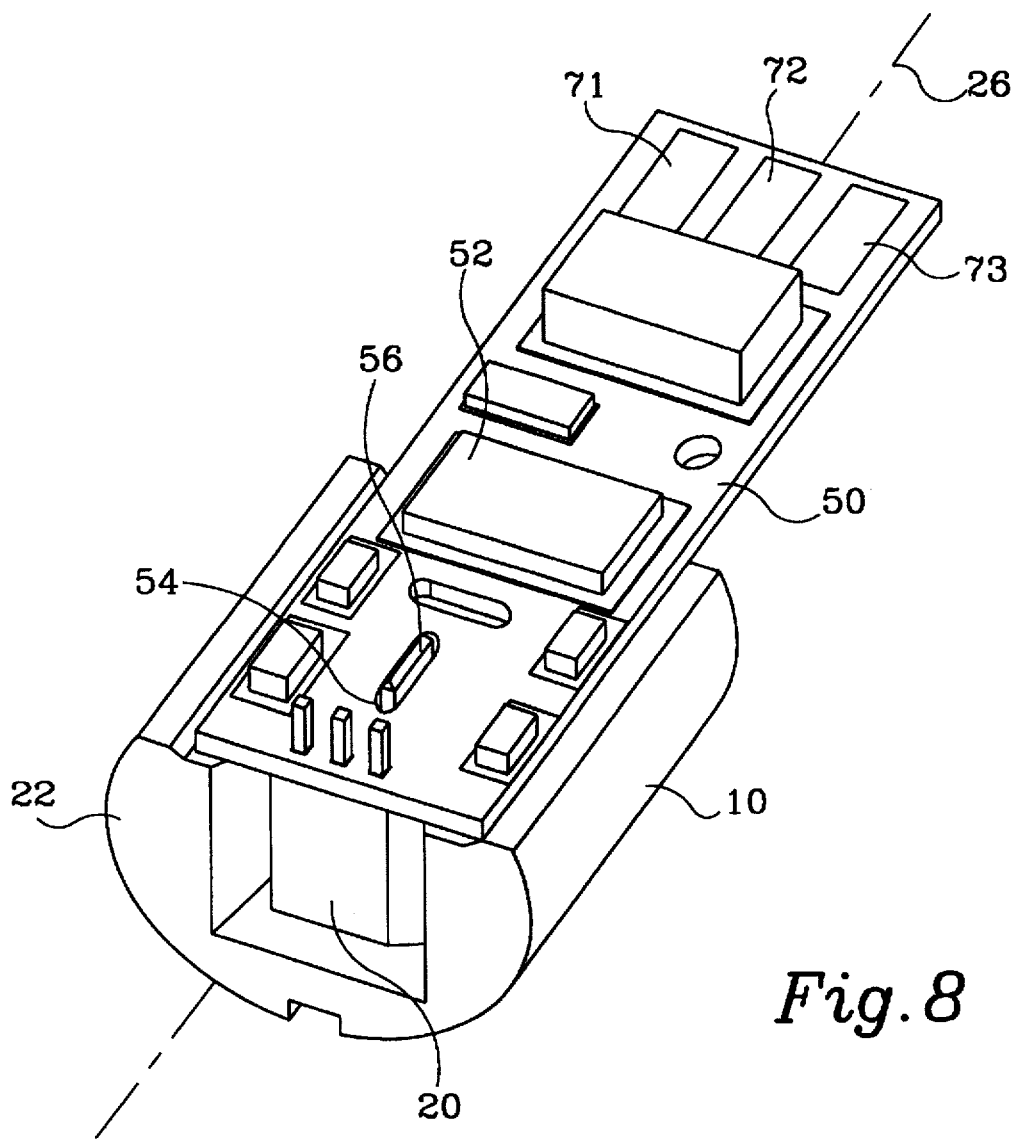
FIG. 8 shows the permanent magnet of FIG. 6 combined with the substrate and magnetically sensitive component of FIG. 7.

FIG. 8 shows the substrate 50 and magnetically sensitive component 20 associated with the permanent magnet 10. The magnetically sensitive component 20 is disposed in the channel 12 of the magnet 10 and the post 56 is extended upwardly through the channel 12 and through the opening 54 of the substrate 50. In the condition shown in FIG. 8, the substrate 50 can be moved a certain distance in a direction parallel with the centerline that extends through the channel of the magnet 10. The clearance between the opening 54 and the post 56 permits this degree of movement without restriction. Naturally, it should be understood that the movement of the substrate 50 is somewhat limited because of the limited amount of clearance provided by the opening 54 around the post 56. During calibration, the output signal from the magnetically sensitive component 20 is monitored at preselected ones of the pads 71–73 as the substrate 50 is moved. When the proper output signal magnitude is achieved, the post 56 is permanently soldered to the substrate 50. To facilitate this rigid attachment, a solderable material is deposited on the printed circuit board surrounding opening 54. This allows the post 56 to be soldered to that prepositioned solderable material in order to achieve the rigid attachment of the substrate 50 to the post 56. This rigid attachment also places the magnetically sensitive component 20 at the preselected position relative to the magnet 10 and rigidly maintains that position.

Figure 9:
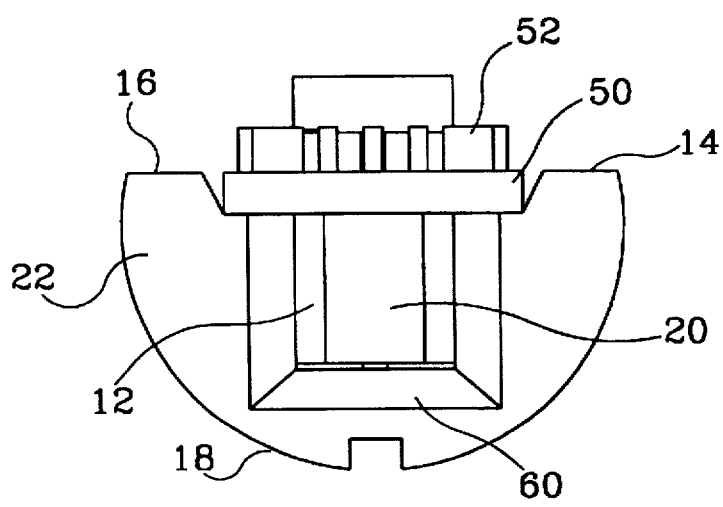
FIG. 9 is an end view of the illustration shown in FIG. 8.

FIG. 9 is an end view of the illustration shown in FIG. 8. It illustrates the first pole face 22 with the channel 12 extending through it and the beveled edges 60 where the first pole face 22 meets the channel 12. In addition, it shows the substrate 50 with the magnetically sensitive component 20 attached rigidly to it. When the substrate 50 is rigidly attached to the post 56, in the manner described above in conjunction with FIG. 8, the magnetically sensitive component 20 is fixed in a desired position within the channel 12. With reference to FIGS. 6 and 9, it can be seen that the depressions, 91 and 92, formed in the flat faces, 14 and 16, of the magnet 10 are helpful in maintaining the position of the substrate 50 relative to the magnet 10. These indentations in the flat faces, 14 and 16, provide a track along which the substrate 50 can slide during the calibration procedure prior to the soldering of the post 56 to the substrate 50.

The present invention provides a magnetic sensor that minimizes the overall size of the sensor and significantly simplifies the calibration procedure. Furthermore, it allows a positive way to anchor the magnetically sensitive component 20 in position within the channel 12 of the permanent magnet 10 without risking moving of the magnetically sensitive component after the appropriate output signal has been achieved during the calibration process. Certain specific features allow these advantages to be achieved. First, the molded magnet 10 is provided with the channel in which the magnetically sensitive component 20 can move. Secondly, the post 56, or rod, provides a means by which the substrate 50 can be anchored to the magnet 10. The opening 54 in the substrate helps to achieve this anchoring in combination with the post 56. The clearance between the opening 54 and post 56 allows a freedom of motion that can be utilized during the calibration process as the desired output signals are achieved as a result of the movement of the substrate 50. These and other characteristics of the present invention allow a simplified and sure means for calibrating the magnetic sensor and reduces the overall size of the sensor. In addition, if the magnetically sensitive component 20 is disposed within the channel 12 of the magnet 10 and does not fully protrude beyond the first pole face 22, the overall length of the sensor is reduced. More importantly, this structure allows the first pole face 22 to be placed more closely to the detection zone where the teeth of a gear are expected to pass. As known to those skilled in the art, significant advantages in accuracy and reliability are achieved when the pole face of the magnet is placed more closely to the detection zone.

Figure 10:
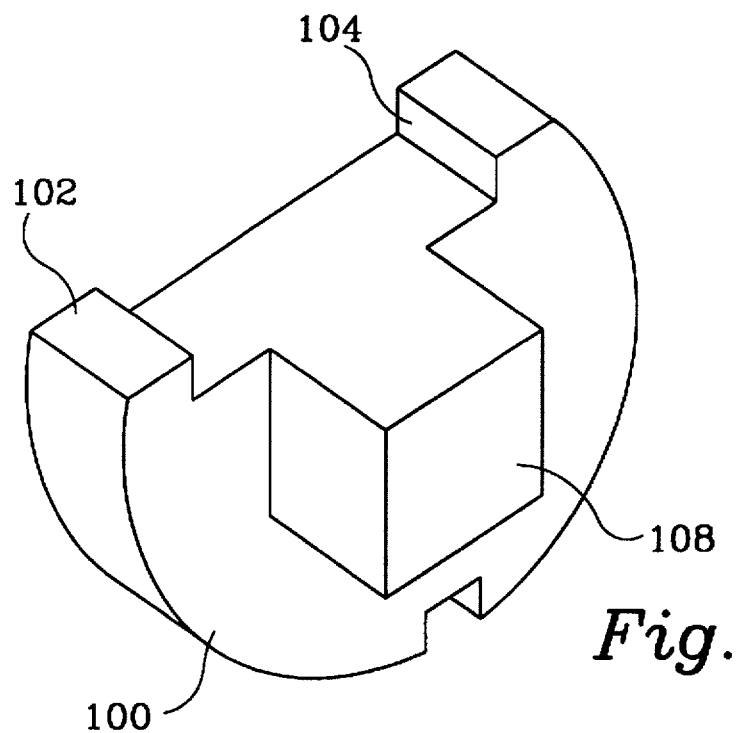
FIGS. 10 and 11 show two embodiments of a pole piece that can be attached to the permanent magnet proximate the second pole face.

FIG. 10 shows a pole piece 100 that can be used in certain embodiments of the present invention to strengthen the magnetic field at the first pole face 22. It is intended to be attached to the second pole face 24. The upward extensions, 102 and 104, are aligned with the flat faces, 16 and 14, respectively. The opening between the upward extensions, 102 and 104, is aligned with the depressions, 91 and 92, to provide clearance for the substrate 50. The protrusion 108 is inserted into the channel 12 to assist with the alignment of the pole piece 100 with the magnet 10.

Figure 11:
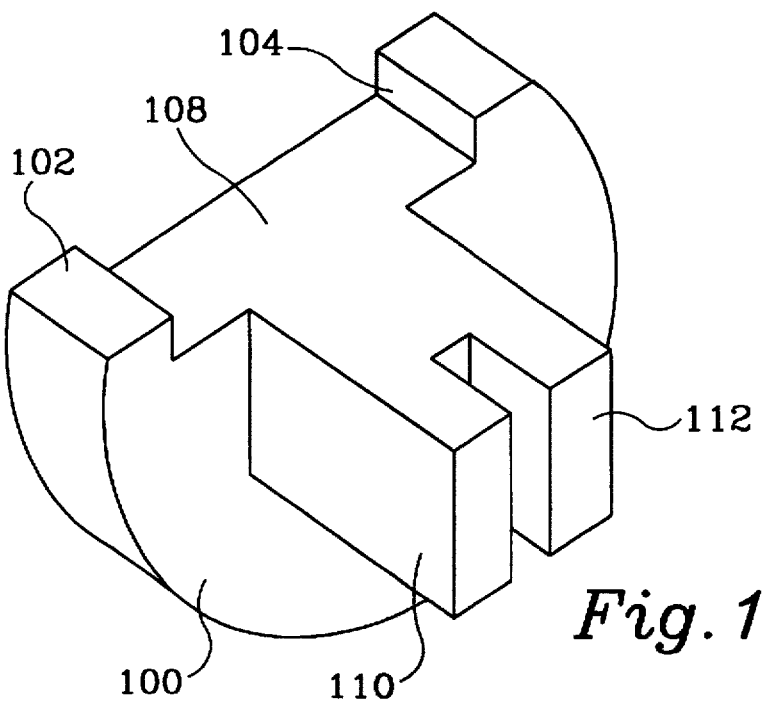

FIG. 11 is an alternative form of the pole piece 100, wherein the protrusion 108 is provided with two separated extensions, 110 and 112. These separated extensions allow the post 56 to pass therebetween when the protrusion 108 of the pole piece is inserted into the channel.

The pole pieces shown in FIGS. 10 and 11 can be used to advantageously affect the magnetic field. This effect can strengthen the magnetic field at the opposite pole face 22. This beneficial effect is the result of the reduction in reluctance through the pole piece 100 proximate the second pole face 24.

Although the present invention has been described with particular specificity and illustrated to show a preferred embodiment thereof, it should be understood that alternative embodiments achieved by modifications of the present invention are also within its scope.

The embodiments of the invention in which an exclusive property or right is claimed are defined as follows:

1. A magnetic sensor, comprising:
   a permanent magnet having first and second pole faces, said first and second pole faces being generally perpendicular to an axial centerline;
   a channel formed in said permanent magnet along said centerline;
   a magnetically sensitive component disposed at least partially within said channel;
   a substrate having an opening formed therethrough, said magnetically sensitive component being attached to said substrate; and
   a post attached to said permanent magnet and disposed through said opening of said substrate, said post being attached to said substrate to locate said magnetically sensitive component at a preselected position relative to said permanent magnet, said preselected position being determined by monitoring an output from said magnetically sensitive component as said substrate is moved relative to said permanent magnet, said post being rigidly attached to said substrate when said output is generally equal to a predetermined magnitude.

2. The sensor of claim 1, wherein:
said permanent magnet is a molded magnet.

3. The sensor of claim 2, wherein:
said post is a metallic shaft molded into said permanent magnet.

4. The sensor of claim 1, wherein:
said magnetically sensitive component comprises a Hall effect element.

5. The sensor of claim 1, wherein:
said post is attached to said substrate with solder.

6. The sensor of claim 1, wherein:
the edges of said permanent magnet, where said first pole face meets said channel, are beveled.

7. The sensor of claim 1, wherein:
said magnetically sensitive component is disposed completely within said channel.

8. The sensor of claim 1, wherein:
said post is formed as part of said permanent magnet.

9. A magnetic sensor, comprising:
   a permanent magnet having first and second pole faces, said first and second pole faces being generally perpendicular to an axial centerline, said permanent magnet being a molded magnet;
   a channel formed in said permanent magnet along said centerline;
   a magnetically sensitive component disposed at least partially within said channel, said magnetically sensitive component having a sensing plane disposed in generally perpendicular association with said centerline;
   a substrate having an opening formed therethrough, said magnetically sensitive component being attached to said substrate; and
   a post attached to said permanent magnet and disposed through said opening of said substrate, said post being attached to said substrate to locate said magnetically sensitive component at a preselected position relative to said permanent magnet, said post being a metallic shaft molded into said permanent magnet, said preselected position being determined by monitoring an output from said magnetically sensitive component as said substrate is moved relative to said permanent magnet, said post being rigidly attached to said substrate when said output is generally equal to a predetermined magnitude.

10. The sensor of claim 9, wherein:
said magnetically sensitive component comprises a Hall effect element.

11. The sensor of claim 9, wherein:
said post is attached to said substrate with solder.

12. The sensor of claim 9, wherein:
the edges of said permanent magnet, where said first pole face meets said channel, are beveled.

13. The sensor of claim 9, wherein:
said magnetically sensitive component is disposed completely within said channel.

14. The sensor of claim 9, wherein:
said post is formed as part of said permanent magnet.

15. A magnetic sensor, comprising:
   a permanent magnet having first and second pole faces, said first and second pole faces being generally perpendicular to an axial centerline, said permanent magnet being a molded magnet;
   a channel formed in said permanent magnet along said centerline;
   a magnetically sensitive component disposed at least partially within said channel, said magnetically sensitive component having a sensing plane disposed in generally perpendicular association with said centerline;
   a substrate having an opening formed therethrough, said magnetically sensitive component being attached to said substrate; and
   a post attached to said permanent magnet and disposed through said opening of said substrate, said post being attached to said substrate to locate said magnetically sensitive component at a preselected position relative to said permanent magnet, said post being a metallic shaft molded into said permanent magnet, said preselected position being determined by monitoring an output from said magnetically sensitive component as said substrate is moved relative to said permanent magnet, said post being rigidly attached to said substrate when said output is generally equal to a predetermined magnitude, said magnetically sensitive component comprising a Hall effect element, said post being attached to said substrate with solder, the edges of said permanent magnet, where said first pole face meets said channel, being beveled, said magnetically sensitive component being disposed completely within said channel and being formed as part of said permanent magnet.

* * * * *